United States Patent
Best et al.

(10) Patent No.: US 8,458,271 B2
(45) Date of Patent: Jun. 4, 2013

(54) HANDLING EMAIL COMMUNICATIONS HAVING HUMAN DELEGATE PREPARED SUMMARIES

(75) Inventors: Steven F. Best, Groton, MA (US); Janice M. Girouard, Austin, TX (US); Timothy B. Snow, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 360 days.

(21) Appl. No.: 12/942,216

(22) Filed: Nov. 9, 2010

(65) Prior Publication Data

US 2012/0117161 A1    May 10, 2012

(51) Int. Cl.
*G06F 15/16*    (2006.01)

(52) U.S. Cl.
USPC ........................................... 709/206

(58) Field of Classification Search
USPC ........................................... 709/206
See application file for complete search history.

(56) References Cited

U.S. PATENT DOCUMENTS

| | | |
|---|---|---|
| 6,816,884 B1 | 11/2004 | Summers |
| 7,082,458 B1 * | 7/2006 | Guadagno et al. ............ 709/204 |
| 7,596,594 B2 * | 9/2009 | Karp ............................ 709/203 |
| 7,693,940 B2 | 4/2010 | Carmel et al. |
| 7,765,212 B2 | 7/2010 | Surendran et al. |
| 2002/0120697 A1 * | 8/2002 | Generous et al. ............ 709/206 |
| 2006/0277258 A1 | 12/2006 | Goldfarb et al. |
| 2008/0244372 A1 | 10/2008 | Rohall et al. |
| 2008/0281927 A1 | 11/2008 | Vanderwende et al. |
| 2009/0100009 A1 * | 4/2009 | Karp ............................... 707/3 |
| 2009/0138557 A1 * | 5/2009 | Lyle et al. .................... 709/206 |
| 2009/0150498 A1 | 6/2009 | Branda et al. |

OTHER PUBLICATIONS

Carenini, et al. "Summarizing Email Conversations with Clue Words." IW3C2: WWW 2007, May 8-12, 2007. Banff, Alberta, Canada.
Ulrich. "Supervised Machine Learning for Email Thread Summarization." Masters Thesis. The Universoty of British Columbia (Vancouver). Sep. 2008. Canada.
Microsoft. "Microsoft Exchange Hosted Archive Administration Guide." Version 7.3. Jan. 2008.

* cited by examiner

*Primary Examiner* — Brian P Whipple
(74) *Attorney, Agent, or Firm* — Patents on Demand P.A.; Brian K. Buchheit; Scott M. Garrett

(57) ABSTRACT

The disclosure provides a solution for delegating email messages for human summaries. In the solution, an email message in an inbox of an account holder can be identified, where the email message has a read status of unread. The email message can be from a sender and can comprise email content. The email message can be sent from the inbox of the account holder to a delegate. The delegate can be associated with an email address corresponding to a human who is not the account holder or the sender. A summary can be received for the email content from the delegate. The summary can be presented in a user interface to the account holder. Responsive to presenting the summary, the read status of the email message can be changed from unread to read.

20 Claims, 6 Drawing Sheets

HANDLING EMAIL COMMUNICATIONS HAVING HUMAN DELEGATE PREPARED SUMMARIES

BACKGROUND

The present invention relates to the field of email communications, and, more specifically, handling email communications having human delegate prepared summaries.

Some email account holders receive an inordinate quantity of messages, which can be challenging for the account holders to handle. For example, celebrities, corporate executives, and the like are often inundated with email messages. Often, one or more human assistants help the account holder to manage their email.

A problem with this practice is that existing email systems are not built to track interactions involving email delegation. For example, when email is forwarded to another person, referred to as a delegate, most email systems automatically mark that email as having been read. An email account holder will likely never give another thought to the delegated message. Similarly, if a delegate provides an account holder of a summary of a set of one or more lengthy email messages, and the account holder reads the message, then only the delegate's message is marked as read. The other messages that were summarized remain marked as unread within the account holder's inbox.

The above situation is further complicated by sets of related email communications or email threads. For example, it can be difficult for a delegate of a message to fully understand the context of that message in absence of the related ones. Hence, a delegate may not possess appropriate information to handle an email message for another, unless all related messages are also conveyed.

Additionally, read status of a related set of email communications can be significant, as delegates can refer whether the account holder has read a message based on this status, and construct summaries accordingly.

SUMMARY

In one embodiment of the invention, the disclosure provides a solution for delegating email messages for human summaries. In the solution, an email message in an inbox of an account holder can be identified, where the email message has a read status of unread. The email message can be from a sender and can comprise email content. The email message can be sent from the inbox of the account holder to a delegate. The delegate can be associated with an email address corresponding to a human who is not the account holder or the sender. A summary can be received for the email content from the delegate. The summary can be presented in a user interface to the account holder. Responsive to presenting the summary, the read status of the email message can be changed from unread to read.

In one embodiment, an email server comprising a storage medium, a summary-to-email-linkage-engine, and a read state handler. The storage medium being for storing email messages and summaries associated with an email account of an account holder. The summary-to-email-linkage-engine being configured to link email messages from senders to an account holder to summaries from delegates to account holders, wherein the summaries are prepared by the delegates for a set of one or more corresponding email messages. The read state handler being configured to maintain an email read status for the email messages of the storage medium that are associated with the email account of the account holder. When the read state handler changes a read status of a summary from unread to read, the read state handler can responsively change a read status of the set of corresponding email messages from unread to read.

DETAILED DESCRIPTION

Figure 1:
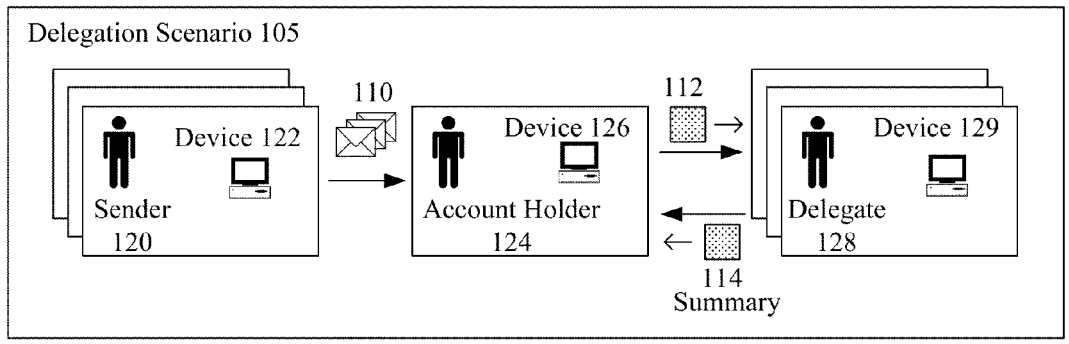
FIG. 1 shows a delegation scenario for handling of email messages, which includes delegated summaries in accordance with an embodiment of the disclosure.
Figure 1:
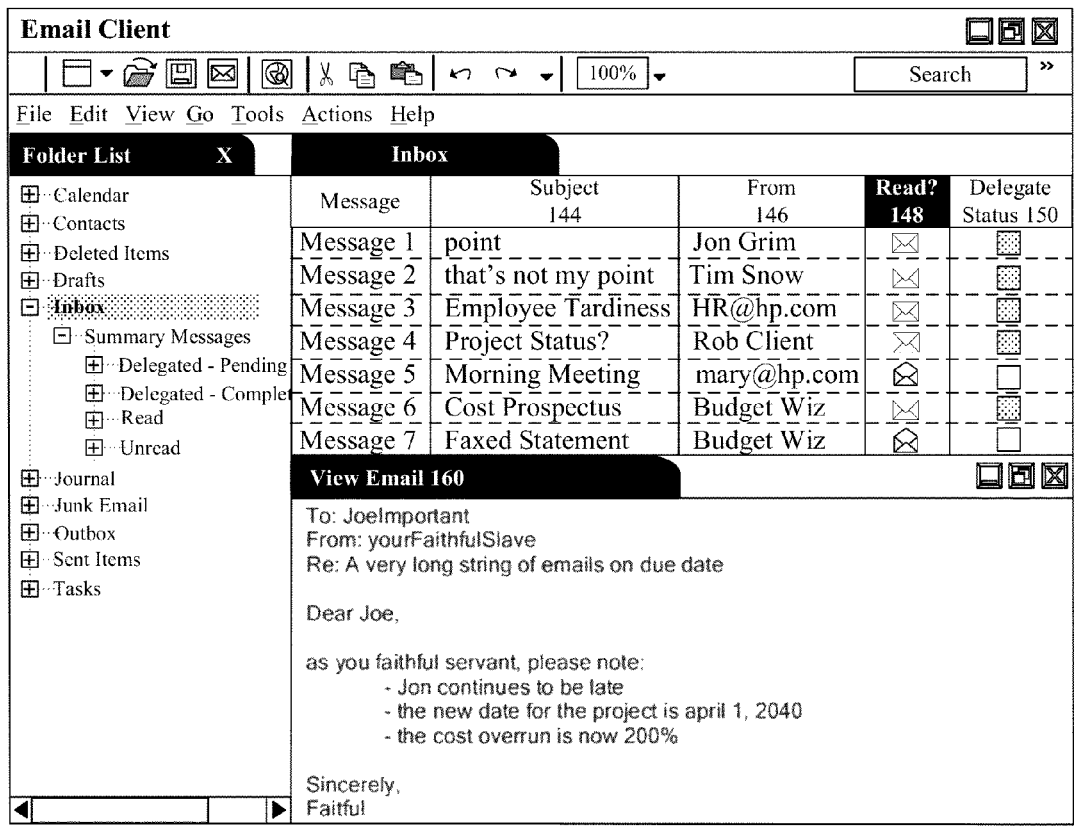

The disclosure provides a solution for delegating email messages to others (referred to as delegates), who provide summaries of the messages to the account holder. More specifically, the disclosure permits an account holder to manually or automatically forward unread email messages to a delegate, without the original messages' read status changing. In one embodiment, related messages can be automatically sent to the delegate when the unread email message is forwarded. Delegation of email messages for purposes of having another prepare a summary can be triggered manually by an account holder or automatically per previously established and user configurable delegation rules.

One such delegation rule can, for example, delegate an email message or a set of email messages for summary preparation after an established period of inactivity. This rule helps manage situations where there is a flurry of email about a specific subject, usually representing project related or event related activity, which rapidly dies down. Then, the set of email messages is delegated, so that a delegate can summarize issues to date about the subject, activity, event for which the flurry of email messages was directed. The above is a non-limiting illustrative example of an automatic delegation rule, others of which are contemplated herein.

Upon receipt of a message, the delegate can provide a summary, which is sent back to the account holder. The delegate may have a special respond with summary button, which indicates what set of email messages the summary applies to. When the account holder reads the summarized message sent from the delegate, the linked messages for which the summary was provided are marked as read.

In one embodiment, when email messages are presented within an account holder's email program, a delegation status can be provided next to the message. Additionally, when a summary has been provided for an email message, a link and/or indicator for the summary can be provided proximate to the message. Further, the summary message can be linked to the messages, which it summarizes.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows a delegation scenario 105 for handling of email messages, which includes delegated summaries in accordance with an embodiment of the disclosure. In scenario 105, one or more senders 120 can create and convey email messages 110 using a computing device 122. At least a portion of the email messages 110 can be directed to a recipient, referred to as an email account holder 124, where these received messages 110 are accessible from computing device 126.

At least a portion (messages 112) of the received messages 110, which are not read by the account holder 124, can be conveyed to a computing device 129 of a delegate 128. This conveyance to the delegate 128 can be performed manually responsive to an explicit delegation operation performed by the account holder 124 and/or can be performed automatically responsive to conditions of a previously established delegation rule being satisfied. Upon receiving the delegation request, the delegate 128 can prepare a summary 114 of the received messages, which are conveyed to the account holder 124. When the account holder 124 reads the summary 114, the otherwise unread messages 112 upon which the summary is based are marked as having been read.

Window 140 shows an inbox screen for an email application running on device 126. A number of messages 142 are shown in the account holder's 124 inbox. For each message 142, a number of characteristics can be shown. These characteristics can include a subject 144, a "from" field 146, whether the message was read 148 or not, and the message's delegation status 150. The delegation status 150 indicates whether a corresponding message 142 has been sent to a delegate 128, and whether a summary 114 has been received for a message.

Message 7 of the inbox is a summary 115 message shown in the reading pane. As can be seen, the delegate 128 (Faithfull) has summarized a set of messages (Messages 1-5). Links to each of these messages are included at the end of the message itself. Clicking on any of these links can result in the corresponding message opening.

Figure 2:
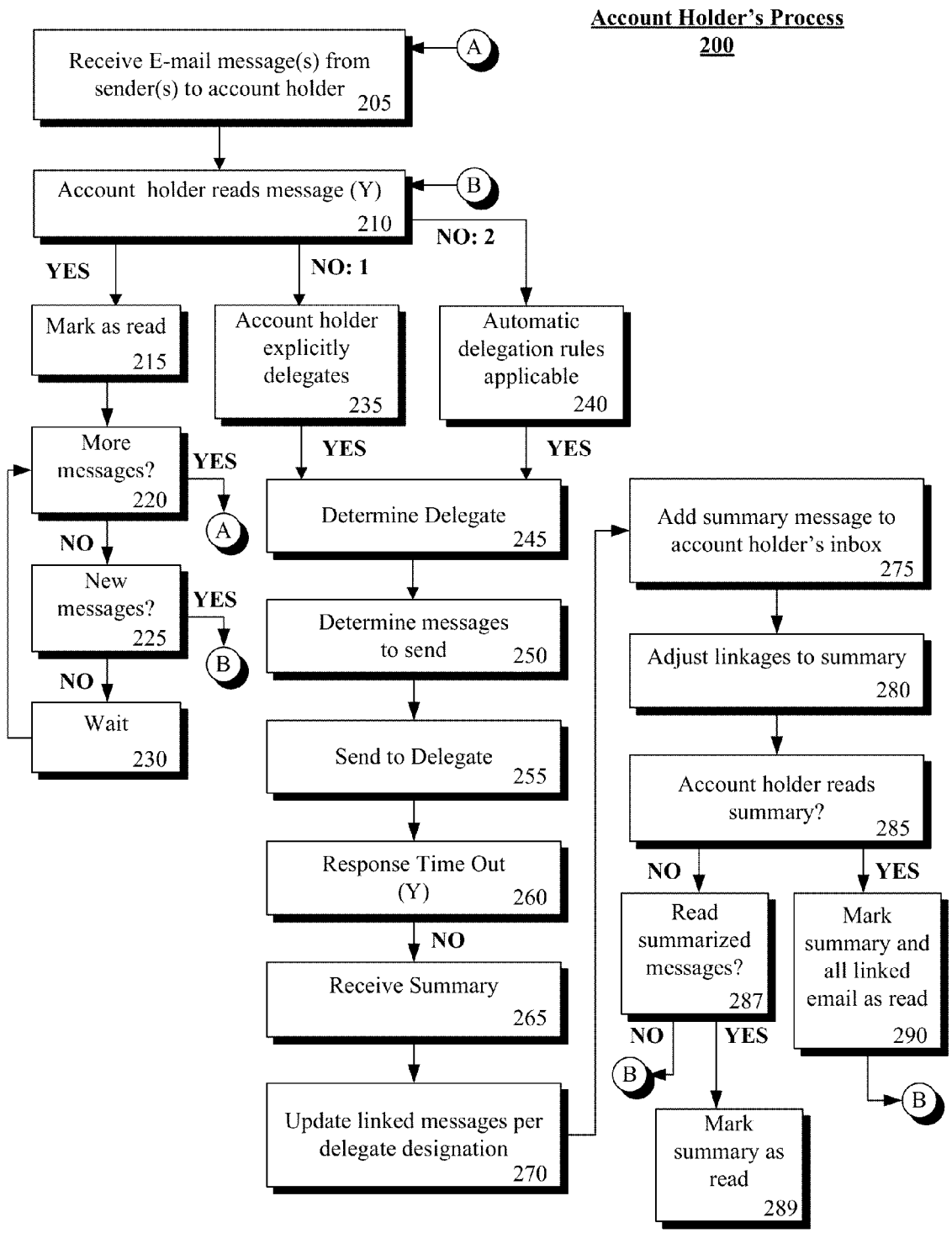
FIG. 2 is a flow chart of a method for handling delegation of summaries for email from an account holder's perspective in accordance with an embodiment of the disclosure.

FIG. 2 is a flow chart of a method 200 for handling delegation of summaries for email from an account holder's perspective in accordance with an embodiment of the disclosure. The method can begin in step 205, where one or more email messages can be received from a set of senders to the account holder. In step 210, the account holder can read zero or more of the email messages.

For each read email message, the email message can be marked as read in step 215. Step 220 shows that more email messages can be processed. Step 225 shows that additional email messages can arrive over time. When no messages are immediately available, a delay period can occur, as shown by step 230, during which period additional email messages to be handled can arrive.

Alternatives for unread email in the account holder's inbox include handling delegation through automatic rules (e.g., step 240) and receiving explicit delegation commands from an account holder for specific messages (e.g., step 235). In either case, should the account holder read the full message (set 210), in one embodiment, delegation actions taken to summarize the message can be halted or revoked (actions resulting from step 235 or 240).

Whether delegation results from a manual account holder action (step 235) or an automated delegation (step 240), each can proceed to step 245, where a delegate for the message is determined. Any of a variety of rules and conditions can be used for automatic delegation at step 240, which can be user configurable. Additionally, a set of related email messages (or other content, such as attachments, remotely located files which the account holder has access to, etc.) can be determined for the delegated message. This entire set of email messages, supplemental documents, links, etc. can be sent to the delegate in step 255, along with a summarization request. Sending the set of email messages and documents (step 250) can insure the summarizing individual possesses the necessary material to properly perform the summarizing task. In one embodiment, (or when an email message is relatively "stand alone"), step 250 can be skipped.

In one implementation or configuration, a response timeout can be established, as shown by step 260. That is, when a delegate has not responded within a determined time period with a summary, another delegate can be assigned to handle the task, as noted from looping from step 260 to step 245. When the delegate does respond with a summary, it can be received in the account holder's inbox (or email server/program used by the account holder), as shown by step 265. In one embodiment, the summary can be an email message, possibly a special type of email message providing links to the related email messages. Use of the email standard for summaries can ensure compatibility with any system implementing an email based protocol. In another embodiment, the summary can be a special record (not necessary a standard email message), which the email server and/or email client is configured to handle. This arrangement can be beneficial in some implementations, where low-level linkages are desired. For example, a specialized summary able to maintain linkages between email messages being summarized and the summaries themselves, can be beneficial from a storage space standpoint, from a security standpoint (e.g., delegates will typically have different access privileges than the account holder, which must be handled), etc.

Once the summary is received, the email messages to which the summary is linked can be updated by the email server (or client in a client-side implementation), as shown by step 270. This updating permits summary icons and other links to be shown next to each related email message and permits links to email messages to be displayed from the summary. It should be noted that the email messages to which the summary is linked can be a delegate selected set of email messages, which can be different from a set of email messages determined in step 250. In step 275, the summary message can be added to the account holder's inbox (or to a special summary section of an email client). In step 280, linkages between the summary and summarized messages can be adjusted, which can include adjustments affecting the GUI of the email client.

In step 285, if the account holder reads the summary, all the related email messages can be marked as read, as shown by step 290. If the account holder does not read the summary, but reads each message that was summarized (step 287) then the summary can be marked as read, as shown by step 289. The method can proceed from either step 289 or step 290 to step 205, where additional email messages can be received and handled per the method.

Figure 3:
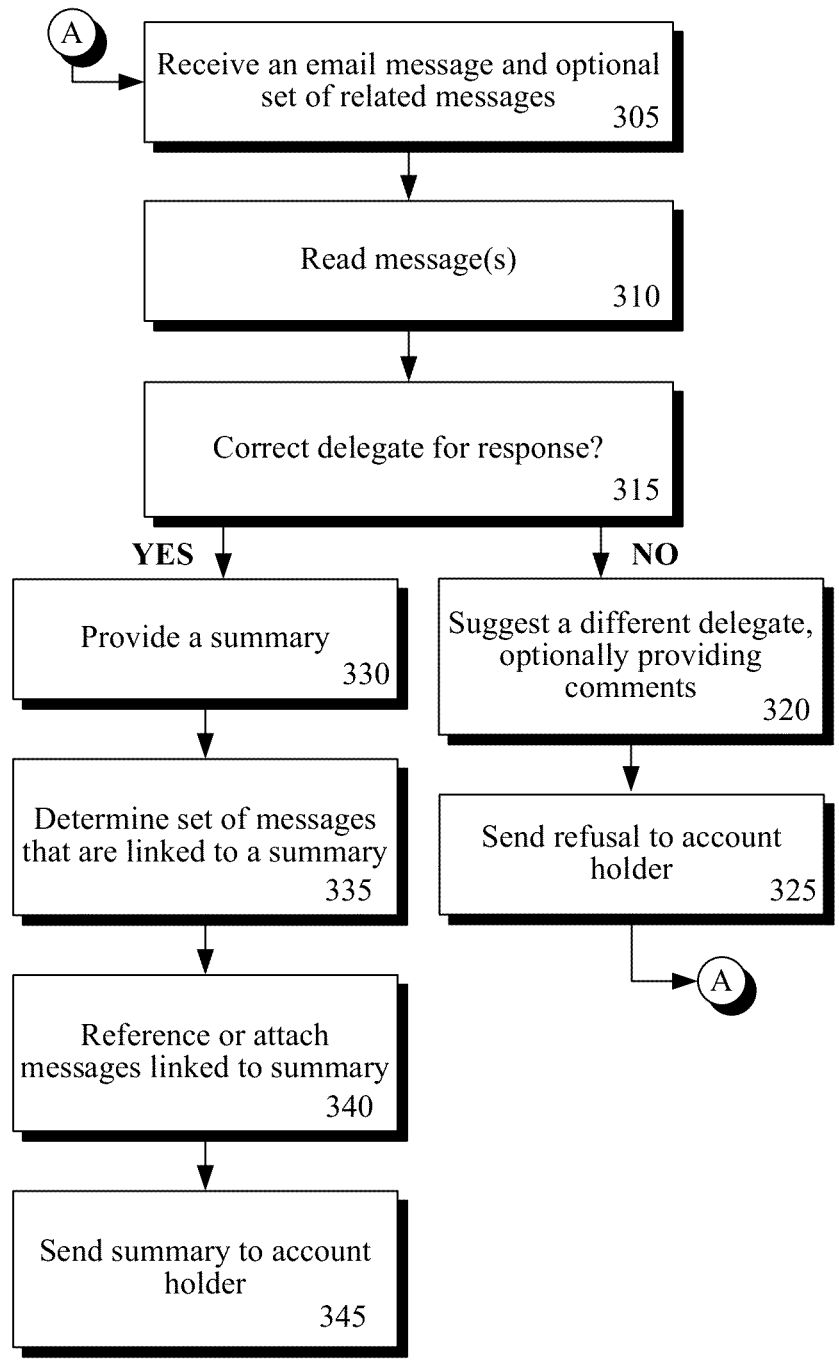
FIG. 3 is a flow chart of a method for handling deleted summaries for email from a delegate's perspective in accordance with an embodiment of the disclosure.

FIG. 3 is a flow chart of a method 300 for handling deleted summaries for email from a delegate's perspective in accordance with an embodiment of the disclosure. The method can begin in step 305, where an email message can be received along with an optional set of related email messages/documents. The received message can be received as part of a summary request. In step 310, the delegate can read the email message(s) and related content. In step 315, the delegate can determine if he/she is the correct person for producing a summary.

If not, he/she can suggest a different delegate and can optionally provide comments to elaborate upon why this other individual is better suited to summarize, as shown by step 320. A refusal message can then be sent to the account holder in step 325. Although not shown, an expiration of a response time-out period can be treated the same as an active refusal by the delegate. The delegate can receive additional summarization requests, as shown by progressing from step 325 to step 305.

When a delegate decides to summarize, the summary can be produced, as shown by step 330. The delegate may be given an option to determine which set of email message a summary is to apply to. If so, the delegate can determine a set of email messages that are to be linked to the summary, as shown by step 335. In one embodiment, an automated process can suggest suitable email messages for linking to the summary, which the delegate is prompted to confirm. In another embodiment, a purely automated process can be used to determine the set of email messages to be linked to the summary, where the delegate may or may not be able to view the automatically selected messages and override the defaults, as necessary.

Each email message referenced may be attached to the summary message in one configuration, as shown by step 340. In another configuration, instead of attaching the referenced email messages, a link to the email messages can be provided. Use of a link (instead of attachments) may require the delegate utilize the same email server that the account holder uses or utilizes a plug-in (at the client or server level), which permits this type of functionality. Regardless, the summary can be sent to the account holder in step 345 and the delegate can handle additional requests (i.e., shown by progressing from step 345 to step 305).

Although not explicitly shown in method 200 or 300, in one contemplated embodiment, a rating system can be established where an account holder can rate a quality of the summary produced by the delegate. This factor can be used to establish a feedback loop for selecting delegates best suited for summarizing. In one embodiment, delegates can receive additional recognition, bonuses, and other benefits based on the quality of the summaries produced. In one embodiment, an automatic process (using pattern matching, account holder behavior, and other criteria) can be used to rate the quality of summaries produced by the delegates.

Figure 4:
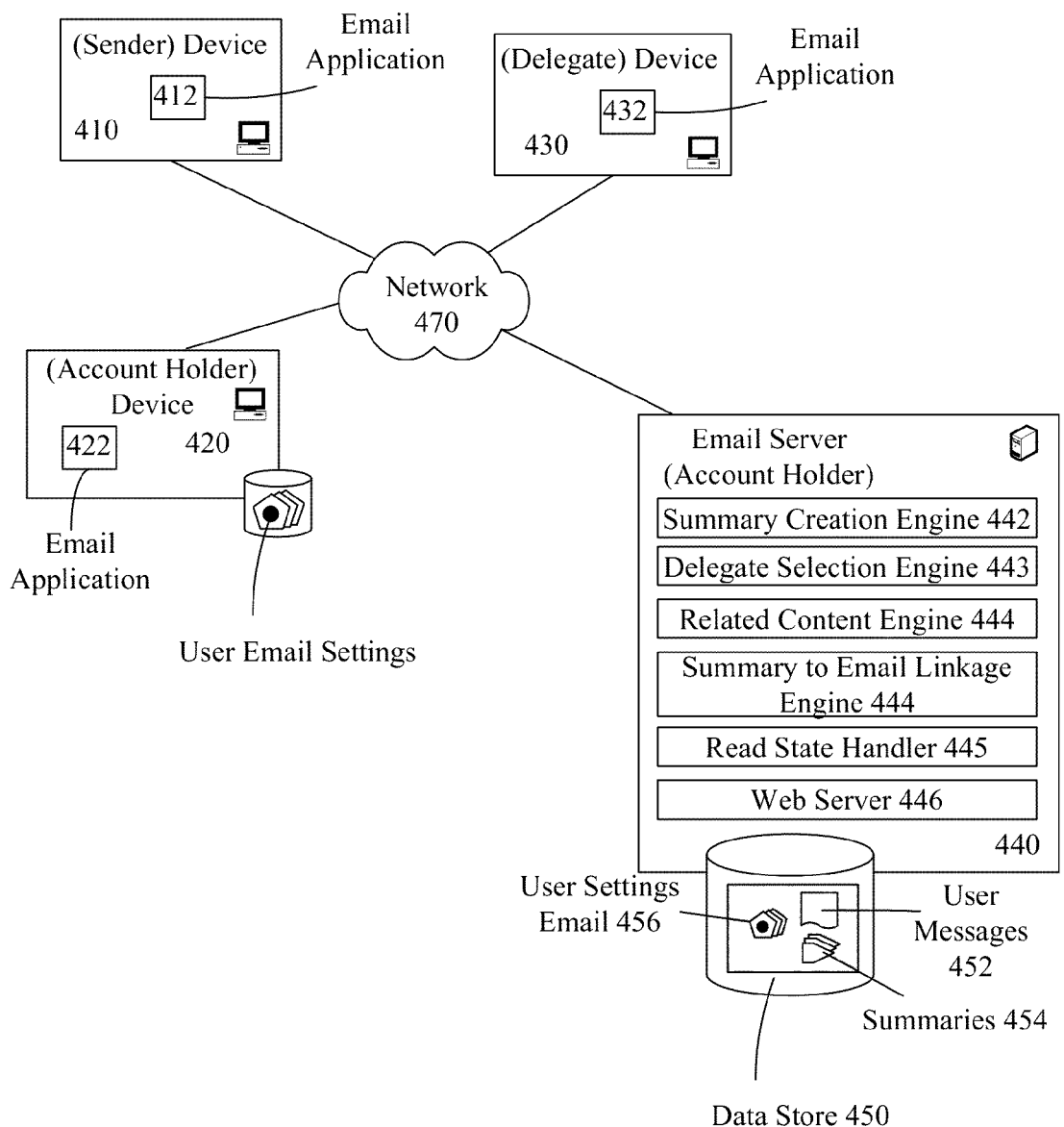
FIG. 4 shows a system within which email communications having human delegate prepared summaries are handled in accordance with an embodiment of the disclosure.

FIG. 4 shows a system 400 within which email communications having human delegate prepared summaries are handled in accordance with an embodiment of the disclosure. In system 400, a set of computing devices 410, 420, and 430 can be connected to a network 470 to which an email server 440 is also connected.

Each computing device 410, 420, 430, and server 440 can include at least one processor, circuitry, storage medium, peripheral, network interface, and/or other components; all communicatively linked to each other via a bus. The processor of each device 410, 420, 430, can execute computer readable instructions, such as instructions of an operating system, firmware, email application 412, 422, 432, email server software (on server 440), and the like. Each computing devices 410, 420, and 430 can be personal computers, a notebook computer, a netbook, a kiosk, a mobile phone, and the like. The email server 440 can be a stand-alone computing device, a distributed set of computing devices, and/or a virtual server implemented using virtualization software.

In one embodiment, sender (120) can utilize device 410, account holder 124 can utilize device 420, and delegate 128 can utilize device 430. The account holder device 420 can present a user interface, such as the one shown in FIG. 1, FIG. 5, and the like. The delegate device 430 can present a user interface, such as the one shown in FIG. 6. Multiple different senders (using device 410) can convey email messages to the account holder (using device 420). Multiple different delegates (using device 430) can produce summaries for the account holder. Although one email server 420 is shown, multiple ones can be utilized in system 400 in one contemplated embodiment. For example, different ones of the delegates can have their email messages hosted on an email server different from that used by the account holder.

Email server 440 can store and manage email messages 542, where the storage of messages can occur in data store 450. Data store 450 can also include summaries 454, and user settings for email 456. Additional user settings can alternatively or conjunctively be stored at a client, such as in a data store of device 440. The summaries 454 can be delegate prepared ones, which may be email messages managed by server 440 in one embodiment. In another embodiment, the summaries 454 can be specialized messages, which are not email message that conform to standard email protocols, which are maintained and managed by the email server 440. In one embodiment, the email server 440 can be designed to function as a backend for a set of client-side email applications. In one embodiment, the email server 440 can serve Web-based clients using Web server 446 to client-side browsers. Thus, email applications 412, 422, and/or 432 can include client-side email applications as well as browsers for rendering a Web email client interface.

The Web server 440 can include a variety of components 442-446 that support delegation and summarization options for email. For example, server 440 can include summary creation engine 442, delegate selection engine 443, related content engine 444, summary to email linkage engine 444, read state handler 445, and/or other such components.

The summary creation engine 442 can be used to automatically generate a summary for an email message. For example, a delegate using device 430 can have summary creation engine 442 automatically generate a summary from a message, which the delegate is to summary. The automatically generated summary can be a "default" which the delegate is able to edit. In one embodiment, the account holder 420 can choose to have engine 442 generate an automatic summary before delegating a message. In one embodiment, an automatically generated summary by engine 442 can be presented in addition to a human (delegate) produced one. In one embodiment, an automatic comparison process can be sued so that an engine 442 produced summary is compared to a human produced one, where the comparison deltas can be sued to provide supplemental information for the human produced summary.

The delegate selection engine 443 can provide a set of rules for automatically delegating email messages to suitable delegates, who are to provide summaries of the messages in response. Any of a variety of rules and conditions can be used for automatic delegation, which can optionally be user and/or administrator configurable. For example, an automatic rule of engine 443 can include triggering delegation when an email message has not been read after at least M amount of time. Another rule can trigger delegation when at least N quantity of related unread email messages have been received and remain unread. Yet another rule can trigger delegation when O amount of time has passed without activity (e.g., no new email messages on a topic are received) and when at least P quantity of related emails have been received. In the above example, M, N, O, and P each represent a configurable integer. The above rules are non-limiting illustrative examples of delegation rules, which have been created to handle specific situations for which delegation is believed to be appropriate (by an account holder, an administrator, etc.). Additional conditions and criteria, such as content based ones can be added to any delegation rule, thereby permitting delegation rules to be established at an arbitrary level of complexity.

For example, the rule to delegate when O time has passed without activity and P quantity of related email messages have been received can be designed to handle a scenario (e.g., use case) where a rapid flurry of related email messages are received followed by a period of inactivity. Once the flurry of email messages have been received, the delegate (through an automatic delegation rule/process) can be asked to summarize the issues, situation, facts relating to the flurry of email messages to date.

In one embodiment, the delegate selection engine 443 can also be used to suggest a set of people for delegating an email message, from which an account holder can make a selection. The rules for delegation can be based upon a person from a delegation list, who is suited for the content of the email message, who is available for responding, based on a person who has been cc'd on the email message to be summarized, and the like. In one embodiment, delegate selection engine 443 can prefer to use the same delegate to produce summaries on a continuous topic or email thread, when that person is available. Factors and criteria used by the delegate selection engine 443 can be customized by an account holder or system administrator.

The related content engine 444 can automatically gather content related to a delegated email message, which is to be presented to a delegate. Engine 444 can include messages related to a delegated email, related reports, related documents, etc. Additionally, external content that help expedite the summarization process and/or enable a delegate to understand a message in context can be provided using related content engine 444.

The summary to email linkage engine 444 can establish linkages, relationships, and the like between email messages 452 and summaries 454. In one embodiment, a database or other indexing can be used to maintain these relationships among messages 452 and summaries 454. In one embodiment, engine 444 need not copy related messages 452 and summaries 454 multiple times, but can establish links among these items, which can be represent a significant space savings. In one embodiment, referential integrity rules can be established so that when an email message 452 or summary 454 is deleted, all related messages 452 and summaries 454 are also deleted. Further, user settings 456 can determine preferences for behavior of server 440 based on linkages established by engine 444. For example, by default a summary 454 can be shown on a user interface (of application 422) when available and when a related message 456 is opened. Linkages 444 can be taken into consideration by an archive solution, when backing email of the server 440 up to a file-based format, and the like.

Read state handler 445 can establish behavior of a read state for the messages 452 and summaries 454. Read state handler 445 can ensure that messages 452 delegated from an account holder of device 420 and sent to a delegate (device 430) are in an unread state. Read state handler 445 can ensure that when a summary 454 is marked as read, a corresponding set of messages 452 are also marked as read. Further, engine 445 can ensure that when a base message 452 is read, a corresponding summary 454 is marked as read.

Network 470 can include any hardware/software/and firmware necessary to convey digital content encoded within carrier waves. Content can be contained within analog or digital signals and conveyed through data or voice channels and can be conveyed over a personal area network (PAN) or a wide area network (WAN). The network 470 can include local components and data pathways necessary for communications to be exchanged among computing device components and between integrated device components and peripheral devices. The network 470 can also include network equipment, such as routers, data lines, hubs, and intermediary servers which together form a packet-based network, such as the Internet or an intranet. The network 470 can further include circuit-based communication components and mobile communication components, such as telephony switches, modems, cellular communication towers, and the like. The network 470 can include line based and/or wireless communication pathways.

Each device 410, 420, 430 and server 440 can include a data store, such as data store 450, which is physically implemented within any type of hardware including, but not limited to, a magnetic disk, an optical disk, a semiconductor memory, a digitally encoded plastic memory, a holographic memory, or any other recording medium. The data stores can be a stand-alone storage unit as well as a storage unit formed from a plurality of physical devices, which may be remotely located from one another. Additionally, information can be stored within each data store in a variety of manners. For example, information can be stored within a database structure or can be stored within one or more files of a file storage system, where each file may or may not be indexed for information searching purposes.

Figure 5:
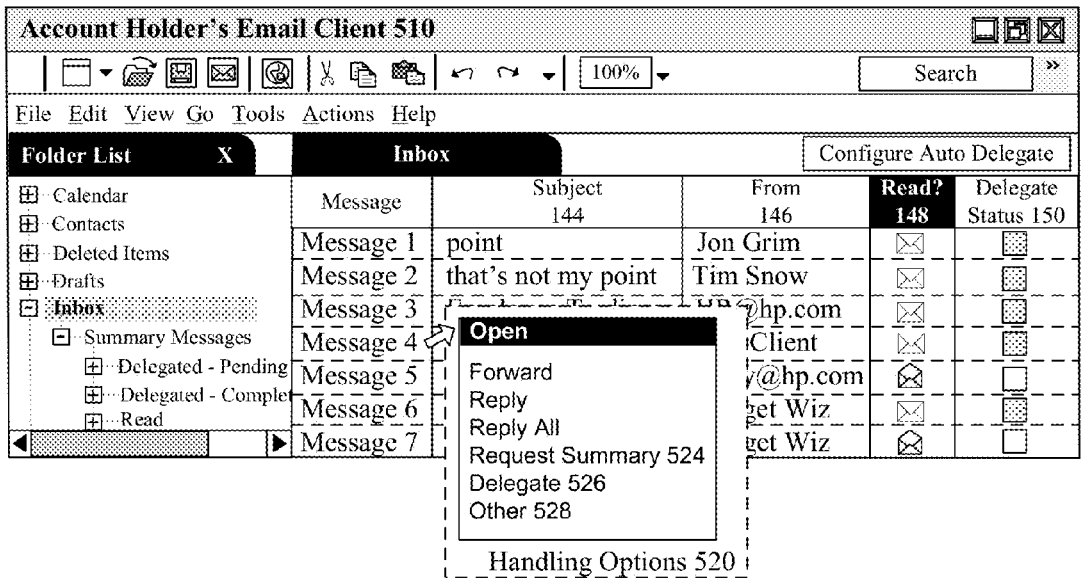
FIG. 5 is shows a set of graphical user interfaces used by an account holder in accordance with an embodiment of the disclosure.
Figure 5:
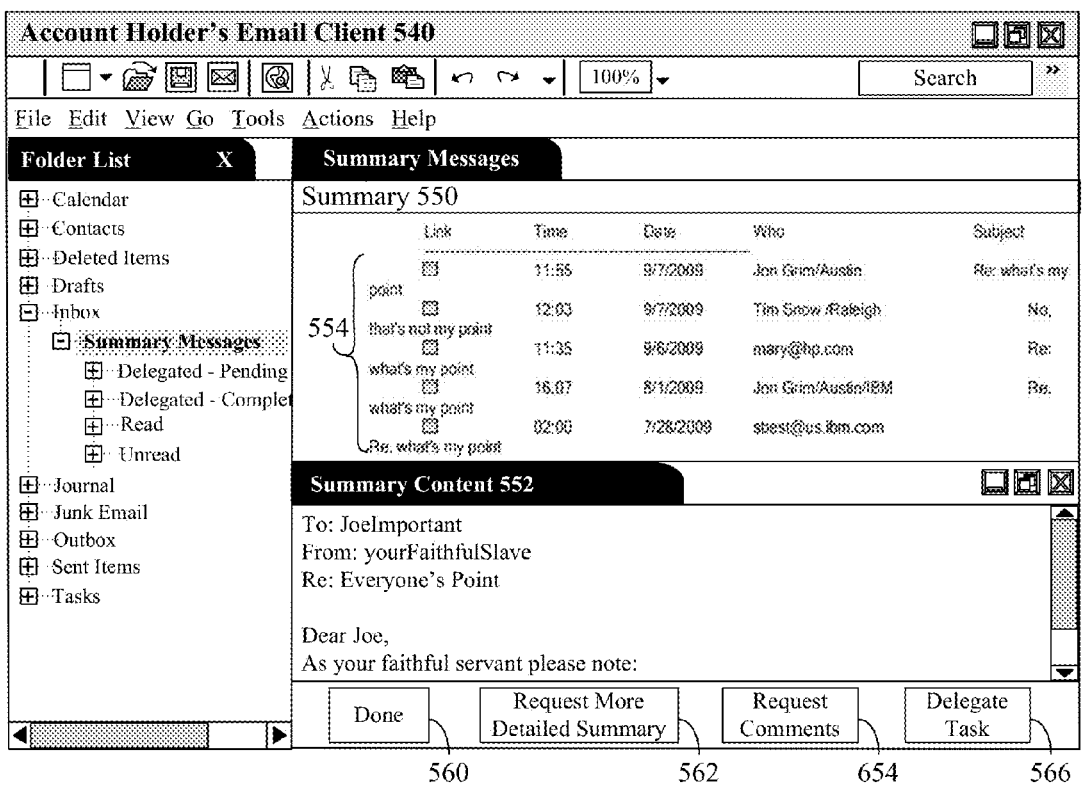

FIG. 5 is shows a set of graphical user interfaces 510, 540 used by an account holder in accordance with an embodiment of the disclosure.

GUI 510 shows an account holder's inbox. The inbox has a number of received messages. For each message, a number of handling options 520 can exist. These handling options 520 can include "conventional" options, such as opening the message, forwarding the message, replying, and replying to all. It should be emphasized that each of these options, when conventionally implemented changes the read status of the corresponding email message from "unread" to read, automatically.

The disclosures introduces a request summary option 524 for a message. Selection of this option sends a summary request to a delegate and forwards the email message to the delegate, while the read-status on the email message is maintained at unread. Optionally, selection of option 524 can include additional related email messages and documents (as attachments, links, or otherwise), which are useful for the delegate in preparing a summary. Additionally, the account holder using interface 510 can optionally select a delegate (i.e., by name, from a suggested list, etc.) in one implementation, in which case GUI elements for selecting and/or entering the delegate's name can appear in interface 510. In another implementation, the delegate can be automatically selected based on the content of the message or other automatically determined factors (i.e., people on the cc or bcc list of the email message, who are subordinates of the account holder, for example).

Although requesting a summary of a delegate (option 524) has been referred to as delegating in the disclosure, interface 510 includes an additional option 526 labeled "Delegate Completely". This option signifies that an external person is sent the email message for handling completely, as opposed to being tasked to summarize the contents for the account holder to later take action upon. When an email message has been delegated completely (per option 526) the read status of the email message can be changed to read, as no further actions are expected by the account holder. Additional actions can also be provided in interface 510, which are indicated by the other option 528.

Interface 540 shows a different view of the inbox of the account holder. In this view, a set of email messages 554 are displayed, where messages 554 that have been summarized are shown under the summary in an expandable node. Clicking on any of these messages 554 will bring up the entire contents of the message. The content of the summary is shown in section 552. Upon reading the summary, a set of related options 560-566 can be presented. If the account holder is done reading, option 560 can be selected, which by default marks the summary 550 and all related messages 554 as having been read.

Alternatively, the account holder can feel a more detailed summary is necessary, at which point button 562 can be clicked, which initiates a request to the delegate who prepared the summary shown in section 562. In one embodiment, upon selecting option 562, the user (e.g., account holder) can enter text detailing what the summary is to include, which it currently lacks, asking specific questions about the messages, etc.

Option 564 is labeled request comments on summary, which automatically sends the summary back to the original sending of one of the messages 554 (or to the email 554 writer's assistant or other third party not the delegate or the account holder). This is a cross check against the accuracy of the summary, which for whatever reason the account holder may question at this point. For example, the matter may be particularly significant, but the actions needed to be taken based on the summary uncertain, so the account holder may wish to confirm that the summary is accurate.

Option 566 is to delegate a task 566 based on the summary. The task delegation can be very different from the delegation of the summary, as the persons to whom the ultimate task is delegated will likely be different individuals. In one embodiment, a person delegated a task per option 566 will be provided with the summary content 552 and/or the messages 554 to provide additional context for the task and to serve as an additional cross check on the accuracy of the summary content 552 in context of the messages 554.

It should be appreciated that the interfaces shown are for illustrative purposes only and are not intended to be comprehensive. For example, the options 520 and 560-566 can be implemented using any of a variety of GUI controls and are not intended to be restricted to those shown.

Additionally, the linkages between summary and related messages can exist throughout the interface. That is, whether a summary or an email message is shown on an interface, a visual indicator can be presented to indicate whether a summary exists for that message (if an email message) and/or whether one or more message have a summary. For example, in one embodiment, when a message is or hovered over, a summary for that message can automatically appear in a pop-up message. In another embodiment, selection of an email message can result in the summary being shown in lieu of or in conjunction with opening the entire message.

Figure 6:
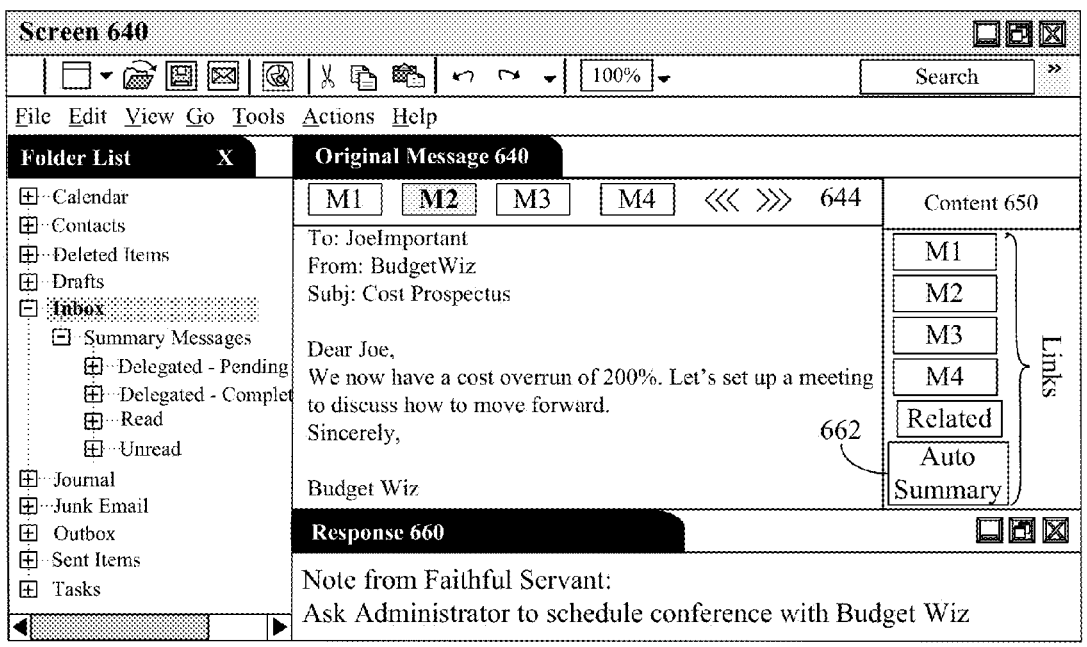
FIG. 6 shows a set of graphical user interfaces used by a delegate in accordance with an embodiment of the disclosure.
Figure 6:
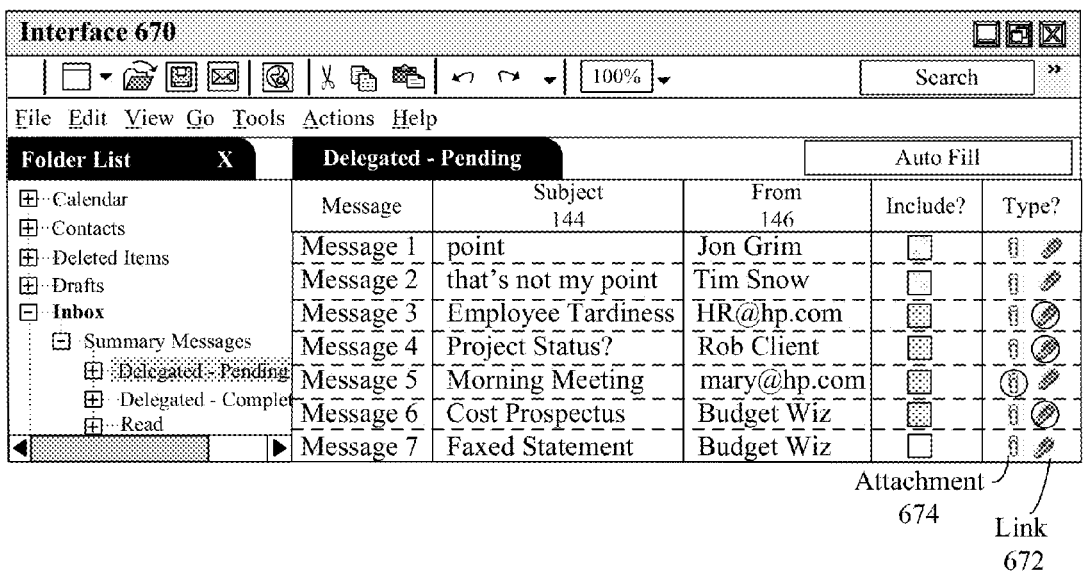

FIG. 6 shows a set of graphical user interfaces 610, 640, 670 used by a delegate in accordance with an embodiment of the disclosure. Pop-up window 610 can appear when a delegate receives a new request for a summary. This pop-up can ask the delegate whether he/she accepts the delegation of the message to produce the summary or not. Specifics for the delegation, such as account holder, original email sender, subject, content, required turn-around time, etc. can be optionally shown in interface 610. In one embodiment, a user can be permitted to read the email message and any related content before accepting or denying the request, per interface 610.

Screen 640 shows a sample user interface, which a delegate uses to prepare a response. The "from", "to", and "subject" fields can be those of the original email, for which the summary is being provided. Further, section 642 can show the original email message sent to the account holder, as well as any attachments that were part of that original message.

In one embodiment, the summary produced by the delegate can be for a set of multiple different messages. Message navigation tools 644 can permit a user to navigate from one of these messages to another. Selection of the different messages from navigation tool 644 results in contents of section 640 and any relevant attachments dynamically changing. The content 650 may or may not change based on which email message is selected in tools 644 depending on whether the content 650 is specific to an email message or is relevant to the set of messages and/or the summary being prepared, in general.

Section 650 can show and/or provide links to additional content. This content can be content related to the message 640. Content 650 can include links to historical threaded conversations, which preceded the message for which the summary is being created. Content 650 can also include documents, which the account holder has access to (but not necessarily the delegate), which are related to the email message being summarized. Additionally, content 650 can provide links or suggestions for related content, such as links to Wikipedia articles for terms/contents/elaborations, which may be familiar to the account holder, but which may help the delegate prepare a more comprehensive and accurate summary. Although shown as links, one or more of the content 650 items can be conveyed as attachments, when the summary preparation message is received.

The response field 660 can be a field in which the delegate types a response. Multimedia options can permit the inclusion of delegate prepared video, graphics, and the like in one embodiment. In one embodiment, the interface 640 can include an option 662 to generate an automatically prepared summary. This automatically prepared summary, if available, can be shown in section 660 and can be edited by the delegate.

Interface 670 permits the delegate to select which set of email messages the summary is applicable to. The delegate can also select via interface 670, whether an email message is to appear in a link 672, an attachment 674, both, or neither. Another option can permit the message to be deleted 676, meaning that message will not be associated with the summary. New 678 messages to be linked to the summary can also be added, in one embodiment.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for delegating email messages for human summaries comprising:
    identifying an email message in an inbox of an account holder having a read status of unread, wherein said email message is from a sender and comprises email content;
    sending the email message from the inbox to a delegate, which is associated with an email address corresponding to a human who is not the account holder or the sender;
    receiving a summary for the email content from the delegate;
    presenting the summary in a user interface to the account holder; and responsive to presenting the summary, changing the read status of the email message from unread to read.

2. The method of claim 1, wherein the summary is contained in email content of an email message sent to the account holder from the delegate, wherein the summary is received in the inbox of the account holder.

3. The method of claim 1, further comprising:
automatically determining a plurality of email messages related to the identified email message; and
sending the plurality of related email messages to the delegate along with said email message along with a request to provide a summary for said email message, wherein said plurality of related email messages are sent to provide context to the delegate to produce the summary.

4. The method of claim 1, wherein the email message is one of a plurality of email messages in a set of email messages, wherein all of the email messages of the set have a read status of unread, wherein the sending of the email message sends the set of email messages to the delegate, wherein the summary is for the set of email messages, wherein the changing that occurs responsive to presenting the summary changes the read status of each of the email messages of the set from unread to read.

5. The method of claim 1, further comprising:
after the summary is received from the delegate, receiving a selection of the email message from a user interface showing the inbox of the account holder; and
responsive to the selection of the email message, presenting the summary, wherein the summary is presented within the user interface instead of the email content.

6. The method of claim 1, further comprising:
indexing, within software of an email server maintaining email messages for the account holder, the summary received by the delegate against the email message for which the summary was produced.

7. The method of claim 1, further comprising:
presenting a link to the email message when presenting the summary, wherein the link is a link to a location at which said email message is stored, wherein selection of the link within the user interface presents the email content within the user interface.

8. The method of claim 1, further comprising:
presenting a delegation option within the user interface of an email application used by the account holder within which the inbox is shown; and
receiving a selection of the delegation option, which results in the sending of the email message without changing the read status of the email message from unread.

9. The method of claim 1, further comprising:
comparing conditions relating to the inbox of the account holder against delegation conditions established within a set of previously configured delegation rules;
when the conditions satisfy each of the delegation conditions of one of the previously configured delegation rules, triggering that delegation rule automatically, which results in the sending of the email message from the inbox to the delegate without a human explicitly delegating the email message.

10. The method of claim 9, wherein said set of previously configured delegation rules comprise at least one of the following rules:
a rule that triggers delegation when a set of email messages have not been read after at least M amount of time;
a rule that triggers delegation when at least N quantity of related unread email messages have been received and remain unread; and
a rule that triggers delegation when O amount of time has passed without activity against a set of related email messages and when at least P quantity of related emails exist in the set of related email messages, wherein M, N, O, and P each represent a configurable integer.

11. The method of claim 1, wherein the user interface is a graphical user interface, said method further comprising:
presenting a visual indicator within the graphical user interface next to an indicator for the email message, said visual indicator showing whether the summary has been received or not.

12. The method of claim 1, wherein the user interface is a graphical user interface, and wherein the email message is one of a plurality of different email messages to which the summary applies, said method further comprising:
showing within the graphical user interface email messages of the inbox, where the summary is shown in the inbox, and wherein each of the different email messages are shown as being grouped under the summary.

13. The method of claim 1, wherein the email message and summary are maintained by an email server, said email server comprising:
a storage medium for storing email messages and summaries associated with an email account of the account holder;
a summary-to-email-linkage-engine configured to link email messages from senders to the account holder to summaries from delegates to account holders, wherein the summaries are prepared by the delegates for a set of one or more corresponding email messages; and
a read state handler configured to maintain an email read status for the email messages of the storage medium that are associated with the email account of the account holder, wherein when the read state handler changes a read status of a summary from unread to read, the read state handler responsively changes a read status of the set of corresponding email messages from unread to read.

14. A computer program product for delegating email messages for human summaries, the computer program product comprising a non-transitory computer readable storage medium having computer usable program code embodied therewith, the computer usable program code comprising:
computer usable program code stored on the non-transitory computer readable storage medium that when executed by a processor is operable to identify an email message in an inbox of an account holder having a read status of unread, wherein said email message is from a sender and comprises email content;
computer usable program code stored on the non-transitory computer readable storage medium that when executed by a processor is operable to send the email message from the inbox to a delegate, which is associated with an email address corresponding to a human who is not the account holder or the sender;
computer usable program code stored on the non-transitory computer readable storage medium that when executed by a processor is operable to receive a summary for the email content from the delegate;
computer usable program code stored on the non-transitory computer readable storage medium that when executed by a processor is operable to present the summary in a user interface to the account holder; and
computer usable program code stored on the non-transitory computer readable storage medium that when executed by a processor is operable to, responsive to presenting the summary, change the read status of the email message from unread to read.

15. An email server comprising:
- a storage medium for storing email messages and summaries associated with an email account of an account holder;
- a summary-to-email-linkage-engine configured to link email messages from senders to an account holder to summaries from delegates to account holders, wherein the summaries are prepared by the delegates for a set of one or more corresponding email messages; and
- a read state handler configured to maintain an email read status for the email messages of the storage medium that are associated with the email account of the account holder, wherein when the read state handler changes a read status of a summary from unread to read, the read state handler responsively changes a read status of the set of corresponding email messages from unread to read.

16. The email server of claim 15, wherein when the read state handler changes a read status of an email message from unread to read, the read state handler responsively changes a read status of the summary corresponding to the email message from unread to read only when each of the set of email messages are all marked as read by the read state handler.

17. The email server of claim 15, further comprising:
- a delegate selection engine configured to automatically delegate at least one of the email messages to an email address of a delegate when previously configured delegation conditions have been satisfied, wherein the delegation selection engine determines the email address of the delegate based on content of the email message being delegated.

18. The email server of claim 15, further comprising:
- a delegate selection engine configured to select a set of delegates for one of the email messages of the storage medium, wherein the set of delegates is presented to an account holder, where a selection of one of the delegates of the set determines an email account to which the email server sends a request to produce a summary for the email message.

19. The email server of claim 15, further comprising:
- a related content engine configured to automatically determine a set of email messages or documents related to an email message that corresponds to a summary, wherein the determined set of email messages are automatically conveyed by the email server to a delegate when a summary for an email message is requested.

20. The email server of claim 15, further comprising:
- a summary creation engine configured to automatically generate a summary based on content of an email message.

* * * * *